April 21, 1936.  S. M. HAWES  2,038,361
TURNER AND EJECTOR FOR OVENS
Filed Oct. 24, 1935  2 Sheets-Sheet 1

WITNESSES
INVENTOR
Susan M. Hawes
BY
ATTORNEYS

April 21, 1936.  S. M. HAWES  2,038,361
TURNER AND EJECTOR FOR OVENS
Filed Oct. 24, 1935   2 Sheets-Sheet 2

WITNESSES

INVENTOR
Susan M. Hawes
BY
ATTORNEYS

Patented Apr. 21, 1936

2,038,361

UNITED STATES PATENT OFFICE 2,038,361

TURNER AND EJECTOR FOR OVENS

Susan M. Hawes, Morristown, N. J.

Application October 24, 1935, Serial No. 46,581

4 Claims. (Cl. 126—275)

This invention relates to a turning and ejecting device for cakes, bread and other articles baked in gas-heated or other forms of stoves, an object being to provide an improved structure wherein a proper and accurate baking may be secured, and, at the same time, an automatic removal of the cake, bread, or other article being cooked.

Another object of the invention is to provide a turning and ejecting device for gas stoves and the like, wherein after the baking operation has been completed, the pan carrying the matter being baked will be dumped in a manner to generally deposit the cake, bread, or the like on a resilient support ready for removal.

A further object of the invention is to provide an apparatus for stoves heated by gas or other medium, wherein cakes and other articles may be dumped properly on a support, and, at the same time, the door of the oven opened.

In the accompanying drawings—

While the device has been illustrated in respect to gas-heated ovens, it might be used with an electrically-heated oven or ovens heated in some other manner.

Figure 3:
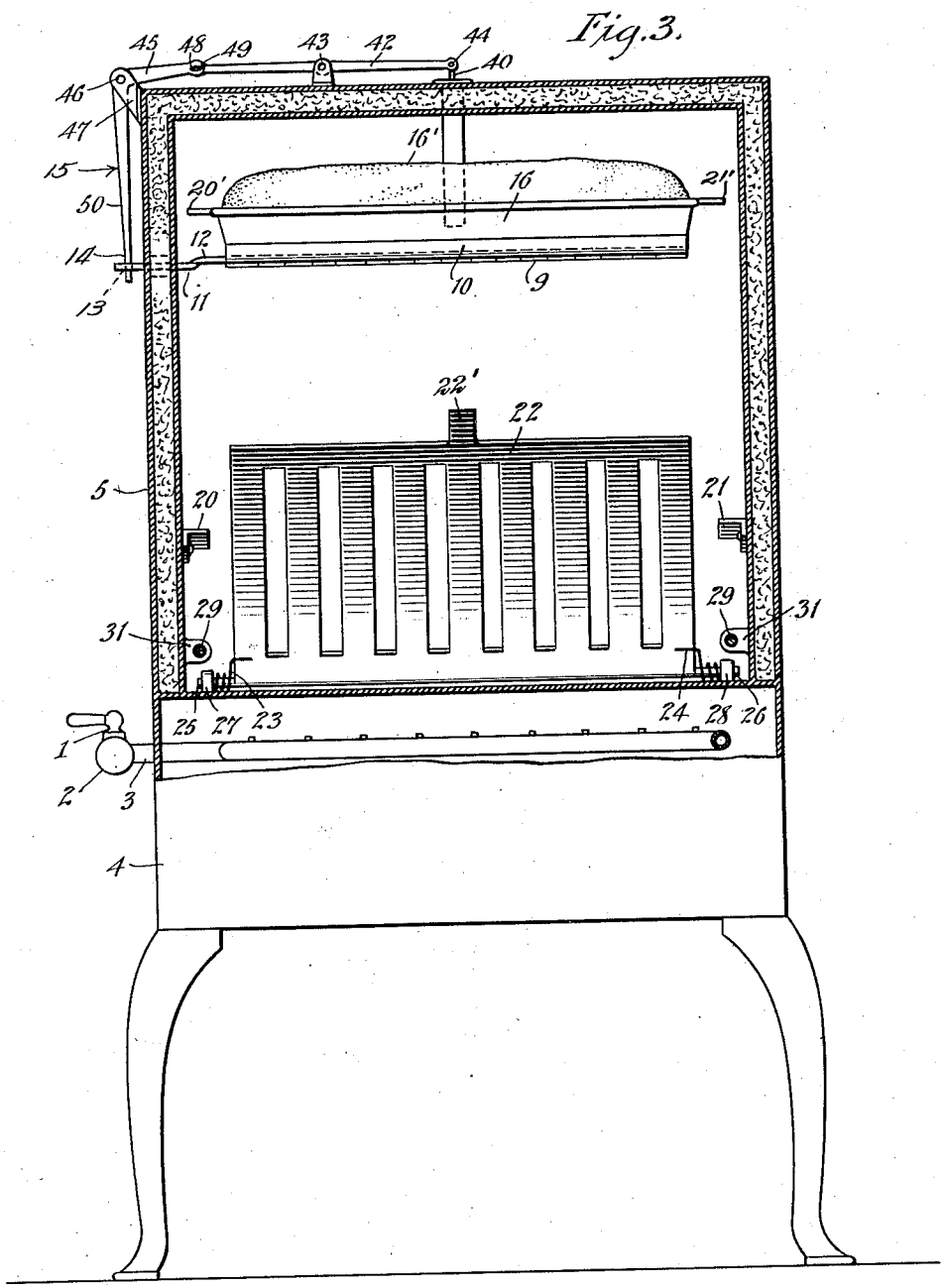
Figure 3 is a sectional view through Figure 1 approximately on the line 3—3.

As illustrated in Figure 3, there is provided a valve 1 in a supply pipe 2. The section 3 of the supply pipe 2 leads into the burner used in the stove and, therefore, whenever the valve 1 is turned off the supply of gas to the burner will also be turned off. It will be understood that the stove 4 may be of any desired make and with a burner of any desired kind supplied with gas from the pipe 2, the construction of the stove forming no part of the present invention except in combination.

Figure 1:
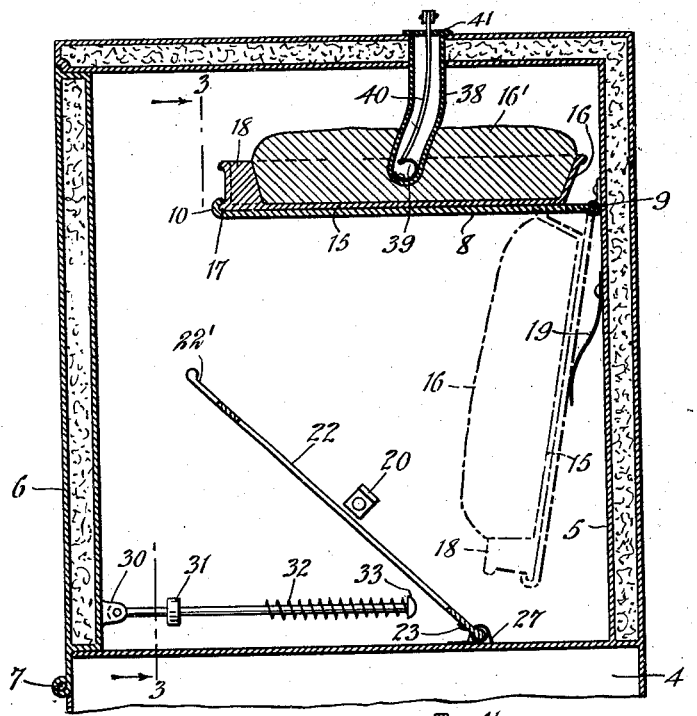
Figure 1 is a vertical sectional view through the oven part of a stove provided with a dumping and ejecting apparatus embodying the invention.

As illustrated in Figure 1, there are provided means which form an oven 5, said oven including a door 6 hingedly mounted at 7. Arranged within the oven 5 is a support 8 which is hinged at 9, said support having a hook end 10. The support 8 could be arranged at any desired height and made of any desired size, but must be made of the proper size and position so that it may readily swing downwardly when released. A reciprocating abutment 11 acts normally to hold the support 8 in an elevated position, said abutment underlying normally an extension 12 on the support 8. If desired there could be an abutment 11 on each side of the oven though ordinarily one is sufficient. As illustrated in Figure 3, the abutment 11 is merely a flat metal member projecting through the wall of the oven 5 and formed with an aperture 13 through which end 14 of bell crank lever 15 extends. When the bell crank lever 15 is moved in one direction the abutment 11 will be pulled from beneath the extension 12 whereupon the support 8 will be released and allowed to swing downwardly to the dot-and-dash position shown in Figure 1.

From Figure 1, it will be seen that along with the support 8 there must be provided a special pan 16 for the cake, bread, or the like 16'. This special pan has a protruding edge 17 adapted to project into the hollow part of the hook 10, also a thickened portion 18 is provided so as to present an overbalancing weight at this part of the pan. When cake, bread, or other articles, are to be baked they are placed in the pan 16 and then moved upwardly to the position shown in Figure 1. After being moved to this position, the abutment 11 is allowed to move beneath the extension 12, the same having been held manually out of operative position. As the cake swings upwardly to the position shown in Figure 1, it is penetrated substantially centrally by a tube 38. This tube is closed at the lower end and rigidly secured to the upper part of the stove. Ordinarily, this tube is comparatively small, as, for instance, about one-fourth inch in diameter. A thermostatic member 39 has one end secured to the closed end of tube 38 and the other secured to a rod 40 which extends rather loosely through the plate 41. A lever 42 pivotally mounted at 43 is pivotally connected at 44 to rod 40 so as to be rocked back and forth as rod 40 moves. A bell crank lever 45 is pivotally mounted at 46 on bracket 47 having an elongated aperture 48 in one end accommodating the pin 49 carried by one end of lever 42. The end 50 of bell crank lever 45 extends rather loosely through an aperture in abutment 11 which is slidingly mounted in the side wall of the oven. When the thermostat 39 is cold the parts are held substantially in the position shown in Figure 3 and when a new cake or loaf of bread is to be baked it is necessary to grasp the end 50 of lever 45 and pull the same so that abutment 11 will be pulled out of the way of extension 12. After number 8 and associated parts have been raised lever 45 is relieved and it will automatically force the abutment 11 to the supporting position shown in Figure 3. The heat is then turned on and the cake is left to bake. Usually, the center of the cake bakes last and consequently the tube 38 is so positioned that it will cause the thermostat 39 to take a position centrally of cake during a baking operation and consequently the thermostat will be heated last. When the thermostat has been heated until the temperature has raised to a certain set point the thermostat will expand and move push rod 40 which will transmit motion eventually to abutment 11 for withdrawing the same whereupon the cake, support 8, and associated parts will be allowed to drop down and the cake allowed to be dumped. As member 22 is forced downward to the position shown in Figure 2 the extension 22' strikes the door 6 and opens the same. As the pan and associated parts swing downwardly they will strike the spring 19, which spring will cushion this downward movement but will allow the pan to move downwardly far enough to permit it to be overbalanced and to swing automatically to the position shown in Figure 2. As the pan swings to the position shown in Figure 2, the protruding lugs 20 and 21 will strike the offset abutments or stops 20' and 21'. This will give the pan a slight jar which is sufficient only to loosen the cake, bread, or the like, whereby the same may fall out of the pan. This falling action is very slight as the bread usually is contacting with the slotted support 22. The slotted support 22 is supported by springs 23 and 24 wound around the extensions 25 and 26 which project through supports 27 and 28. As the support 22 swings downwardly it will wind the springs 23 and 24 and this resistance will become greater and greater until the parts finally assume the position shown in Figure 2. In this way, the article will be dumped without any great jar or disturbance.

Figure 2:
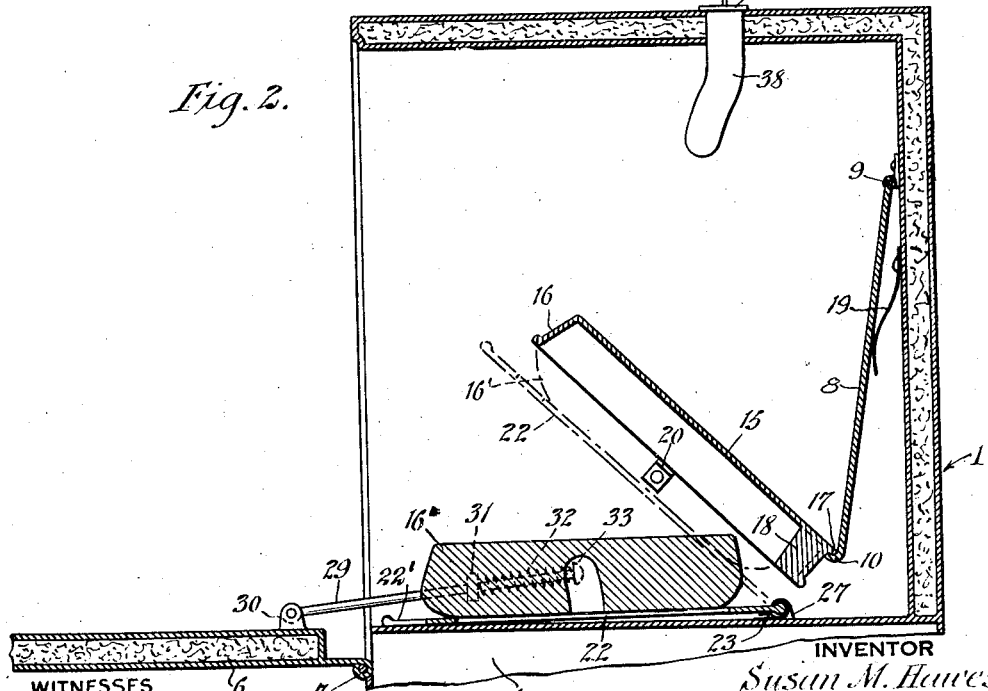
Figure 2 is a view similar to Figure 1 but with the parts shown in their dumping position.

At the same time that the pan and associated parts swing downwardly and are then dumped, the extension 22' of support 22 will strike door 6 and thereby cause the door to swing to the open position as shown in Figure 2. Preferably, there are provided two retaining bars 29 for preventing the door from swinging downwardly too far. Each of these rods is pivotally connected with a post 30 on the door and slidingly extend through a post 31 on one of the walls of the oven 5. A spring 32 surrounds each of the rods 29 with one end bearing against an enlarged head 33 and the other end against the post 31, whereby there will be provided a cushioning effect to the door as it moves downwardly. The door is normally held closed by friction. By reason of this structure, a person may place an article to be baked in the oven and set the various parts and leave for an indefinite time. When the cake or other article has properly baked the parts will automatically function to open the door 6 and permit the baked article to swing downwardly and be dumped as shown in Figure 2. After the article has been dumped, the person using the stove may at some convenient time remove the cake or other article.

I claim:

1. In combination an oven, a pan-receiving support hingedly mounted on the wall of said oven, an abutment for normally holding the support in an elevated position, a pan normally carried by said pan-receiving support, said pan-receiving support and said pan being formed with normally interlocked means for causing said pan and the article carried thereby to swing under the action of gravity away from the pan-receiving support in a downward direction when the pan-receiving support has swung downwardly to its extreme lowest position, an article-receiving plate arranged below said support for receiving said article, means for moving said abutment away from said support, whereby the support may swing downwardly and the article thereon may swing on to said article-receiving plate and a thermostat carried by said oven positioned to project into the center of said article when said pan-receiving support is supported by said abutment, said thermostat when functioning acting to actuate said means for releasing said abutment.

2. In a device of the character described, the combination of an oven having a hingedly-mounted door, a swinging plate for automatically opening said door, a gravity actuated pan support hingedly mounted on the wall of said oven, an article-carrying pan carried by said support, thermostatically controlled abutment for holding said support in an elevated position, a thermostat carried by said oven positioned to project into substantially the center of said article when the article is in baking position, said thermostat when functioning acting to cause said means to move away from said support so as to release the support, a pair of stationary stops below said support, said swinging plate being arranged adjacent said stops, and adapted to open said door when swung downwardly, the pan on said support when falling therefrom being engaged by said stationary stops while the material in the pan will continue to move on to said spring held plate for swinging the same downwardly.

3. In a device of the character described the combination with an oven having a hingedly mounted door, a gravity actuated support hingedly mounted on the wall of said oven, a hook edge opposite the hinge mounting thereof, a pan for receiving an article to be baked, said pan being adapted to rest on said support, said pan having a projecting flange fitting into said hook edge, whereby when said support swings downwardly and the pan is overbalanced it will swing in the arc of a circle using the said flange as a pivotal point, stationary abutments positioned to engage the edge of said pan for stopping its swinging movement when almost inverted, a pivotally mounted spring held plate arranged immediately below said support for receiving and lowering the article from said pan, said spring held plate being positioned so that when it is swung by the weight of said article it will strike said door and cause the same to swing open, a movable member for normally supporting said support, mechanism for moving said member for releasing said support, and a thermostat for actuating said mechanism, said thermostat being carried by said oven and positioned to project substantially into the center of the article being baked so that it will function when the center of said article has reached a certain temperature.

4. In a device of the character described, the combination with an oven, a pan support hingedly mounted on the wall of said oven, said support opposite the hinge mounting being provided with a hook shaped edge, a pan having a flange fitting into said edge and a weight adjacent said flange, an abutment arranged adjacent said hook shaped edge for holding the hinged support in an elevated horizontal position, said support and the pan carried thereby being adapted to swing downwardly when the abutment is removed, said downward swinging movement causing the support to assume an almost vertical position and the pan to swing in an opposite direction with said flange as a pivotal point, means for checking the swinging movement of said pan, and a spring held member for catching anything discharged from said pan.

SUSAN M. HAWES.